March 4, 1941.   F. LUENZ   2,234,052
VALVE
Filed July 12, 1940
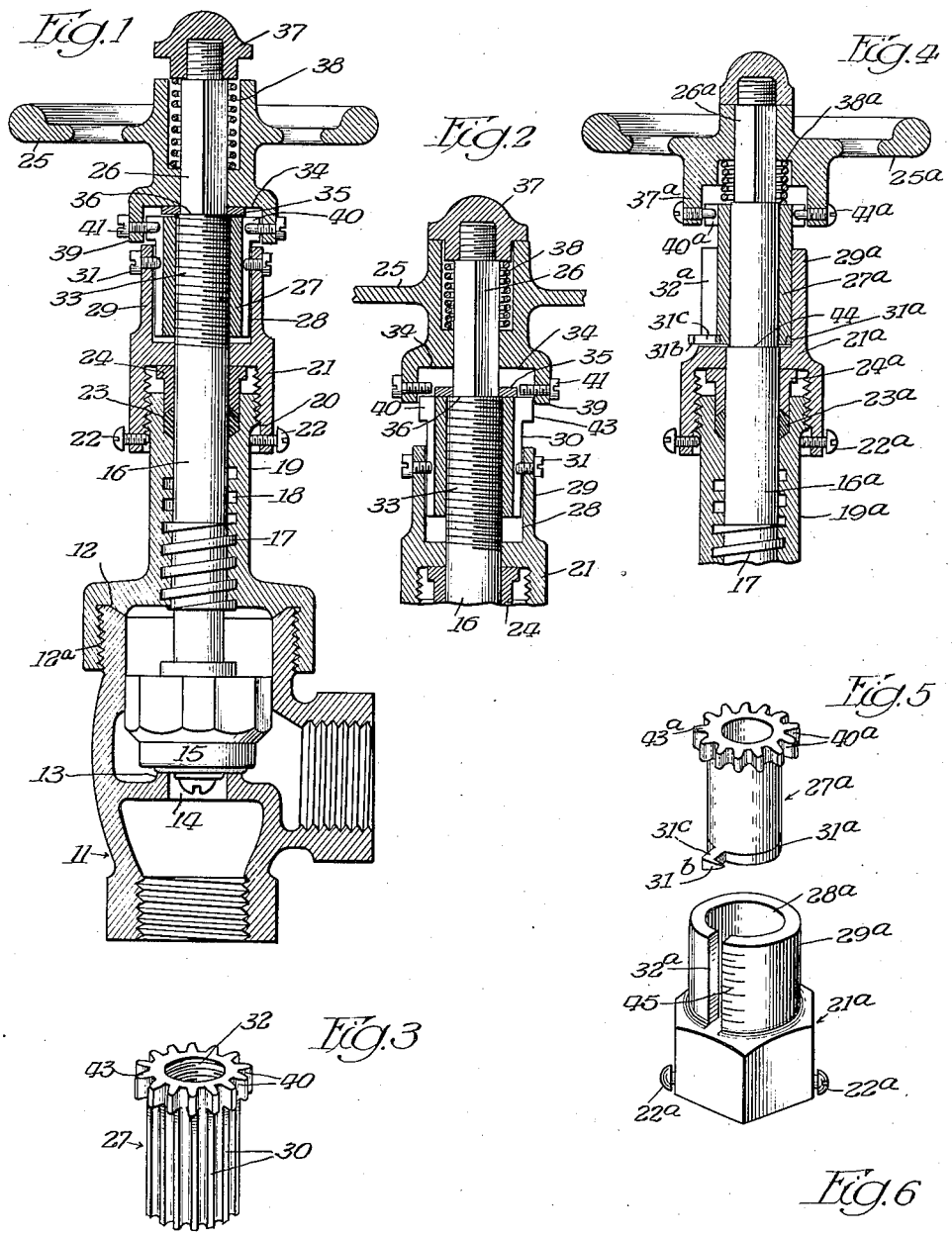
Inventor.
Franz Luenz
By Fred Gerlach
his Atty Patented Mar. 4, 1941

2,234,052

UNITED STATES PATENT OFFICE 2,234,052

VALVE

Franz Luenz, Chicago, Ill., assignor of one-half to
John Hollis Gleason, Chicago, Ill.

Application July 12, 1940, Serial No. 345,076

15 Claims. (Cl. 251—165)

The invention relates to valves.

One object of the invention is to provide a valve which comprises a stem for rotating the plug or gate, and a handle for opening and closing the valve, with improved means for locking the stem against rotation so that the gate or plug will be secured against displacement from its assigned positions.

Other objects of the invention will appear from the detailed description.

The invention consists in the several novel features which are hereinafter set forth and are more particularly defined by claims at the conclusion hereof.

In the drawing: Fig. 1 is a section through a valve embodying one form of the invention; Fig. 2 is a similar section showing the handle in its unlocked position and the stem raised to open the valve; Fig. 3 is a perspective of the slidable locking-sleeve around the valve-stem; Fig. 4 is a section illustrating a modified form of the invention; Fig. 5 is a perspective of the locking sleeve of the construction illustrated in Fig. 5; Fig. 6 is a perspective of the outer sleeve member of the construction shown in Fig. 4.

The invention is exemplified in a valve comprising a casing which includes a body 11 provided with inlet and outlet connections, and a head 12 connected to the body by a screw-thread 12a, a crosswall in the body provided with a seat 13, a port 14 extending through the seat for the passage of fluid through the casing and from the inlet to the outlet, a gate or plug 15 adapted for opening and closing the port 14 through seat 13, a stem 16 rotatably connected to the gate 15 and provided with a screw-thread 17 fitting in a female thread 18 in an upward extension 19 of head 12. The screw-threaded connection between stem 16 and head 12 reciprocates the plug 15 to and from seat 13, as well understood in the art.

The upper end of extension 19 on head 12 is provided with a screw-thread 20. An outer sleeve-member 21 is threaded to screw-thread 20 and is adapted to be secured against rotation relatively to the head 12 by screws 22 which are adapted to engage said head. A packing box containing packing 23 is formed in the upper end of extension 19 of head 12. A follower sleeve 24 for packing 23 is engaged by the crosswall of the sleeve 21, for preventing escape of fluid between the stem and extension 19 of head 12. Rotation of sleeve 21 around extension 19 will force the follower 24 downwardly to keep the packing 23 tight around stem 16. A handle or hand-wheel 25 is adapted to rotate stem 16 through a polygonal bore fitting around polygonal portion 26 of the stem 16.

A cylindrical locking sleeve 27 is slidable longitudinally in the bore 28 of a cylindrical upward extension 29 of sleeve-member 21. Sleeve 27 is provided with a series of longitudinal grooves 30 in its outer periphery. Screw-pins 31 are threaded to the extension 29 adjacent its upper end and the inner ends of the pins extend into the grooves 30 to lock sleeve 27 against rotation while permitting longitudinal movement of said sleeve in extension 29. The bore of sleeve 27 is provided with a left-hand screw-thread 32 which is engaged by a corresponding thread 33 on the stem 16. Rotation of stem 16 and screw-thread 33 slides the sleeve 27 upwardly when the stem 16 is turned to open the valve and downwardly when the stem is turned in the reverse direction to close the valve. The screw-threads 32, 33 are of a finer pitch than the thread 17 so that a proportionately shorter movement will be imparted to the sleeve 27 than to the gate 15. The hub of hand-wheel 25 is provided with a shoulder 34 for engaging a washer 35 which engages an upwardly facing shoulder 36 on stem 16. A nut 37 is screw-threaded to the upper end of stem 16 above polygonal portion 26. A coil-spring 38 fitted in a socket in handle 25, engages nut 37 and the bottom of said socket and normally presses the hand-wheel 25 downwardly within the limits permitted by washer 35 and shoulder 36 on the stem. The lower end of the hub of wheel 25 is provided with a depending circumferential flange 39. Locking sleeve 27 is provided with an annular series of notches 40 which extend vertically through a projecting integral flange 43 on the upper end of the sleeve. Flange 43 is normally positioned within flange 39. A pair of screw-pins 41 are threaded through the depending flange 39 and are adapted to extend into the notches 40 of flange 43 of sleeve 27 to lock the hand-wheel against rotation in the different positions to which it may be rotated. Normally spring 38 presses the hand-wheel downwardly against washer 35 and the pins 41 extend into the notches 40 and secure the hand-wheel against rotation. When it is desirfed to turn the valve, when it is in either its opened or closed position, the operator will raise hand-wheel 25 against the force of spring 38 and, until arrested by the nut 37, at which time the pins 41 will clear the upper end of sleeve 27 so that the hand-wheel can be rotated, and through its polygonal connection 26 with the stem, rotate the latter to shift the gate 15.

When the valve is in its closed position, as shown in Fig. 1, the pins 41 will lock the handle to sleeve 27. When the handle has been lifted so it is released from sleeve 27 and then rotated, the screw-thread 33 will slide the sleeve 27 in extension 29 and cause said sleeve to follow the handle but, owing to the difference in the pitch of the screw-threads 33, 17, the sleeve will move a shorter distance than the stem. The left-hand thread 33 causes the sleeve 27 to move upwardly relatively to stem 16 when the stem is raised.

When the valve is closed, as illustrated in Fig. 1, handle 25 will be pressed downwardly and pins 41 which extend into the notches 40 in flange 43 of sleeve 27, will lock the hand-wheel against rotation. The sleeve 27 will be locked against rotation by screw-pins 31 and sleeve-member 21 will be locked by screws 22 against rotation relatively to the valve-casing. When it is desired to open the valve the operator will pull hand-wheel 25 upwardly against the force of spring 38 until it is arrested by nut 37. Pins 43 will then be raised above flange 43 and out of notches 40 so that the hand-wheel will be unlocked for rotation. While the handle is held raised, as illustrated in Fig. 2, valve-stem 16 can be rotated through the polygonal connection 26 between the stem and the hand-wheel. As the valve-stem is rotated, screw 33 will raise sleeve 27. When the valve-gate has been opened the desired extent, the operator will release hand-wheel 25 and spring 38 will press it downwardly to bring pins 41 into notches 40 and, thereupon, the hand-wheel and stem will be again locked against rotation. When it is desired to tighten the packing 23, it is only necessary to loosen screws 22 and rotate sleeve-member 21 to force follower 24 into the packing-box. The screws 31 may be withdrawn from grooves 33 during this adjustment.

In the modified form of the invention illustrated in Figs. 4, 5 and 6 the valve-stem 16$^a$ extends through the extension 19$^a$ of the head of the valve-casing. A packing-box 23$^a$ is provided in extension 19$^a$. An outer sleeve or sleeve-member 21$^a$ is connected by a screw-thread to the upper end of extension 19$^a$, engages a packing follower 24$^a$, and is provided with jamb-screws 22$^a$ whereby member 21$^a$ may be locked to extension 19$^a$ against rotation. A cylindrical locking sleeve 27$^a$ is slidably mounted in the bore 28$^a$ of a cylindrical upward extension 29$^a$ of member 21$^a$. A ring 31$^a$ is fixedly secured to the lower end of sleeve 27$^a$ and is provided with an outwardly extending lug 31$^c$ which extends through a vertical slot 32$^a$ in extension 29 and holds sleeve 27 against rotation in member 21$^a$, while permitting longitudinal sliding movement of the sleeve. Stem 16$^a$ is provided with an upwardly facing shoulder 44 which engages the lower end of sleeve 27$^a$ so that the sleeve will be raised with the stem. The upper end of sleeve 27$^a$ is provided with an integral outwardly extending flange 43$^a$. A series of notches 40$^a$ extend vertically through flanges 43$^a$. The lower end of the hub of handle 25$^a$ is provided with a socket surrounded by a depending flange 37$^a$ which normally extends around the flange 43$^a$. Screw-pins 41$^a$ are threaded to flange 37 and their inner ends are adapted to extend into notches 40$^a$ to lock the handle 25$^a$ against rotation. A coil-spring 38 extends around the polygonal portion 26$^a$ of stem 16$^a$ between the handle and the upper end of sleeve 27$^a$. The spring normally presses the handle 25$^a$ upwardly against a cap-nut 37$^a$ which is threaded to the upper end of stem 16$^a$. The spring permits the handle 25$^a$ to be pressed downwardly to move pins 41$^a$ below flange 43$^a$ and release the handle for rotation relatively to sleeve 27$^a$. Handle 25$^a$ is slidable on the polygonal portion 26$^a$ of stem 16$^a$ and is provided with a polygonal bore for rotating the stem with the hand-wheel. When the hand-wheel is locked against rotation, the stem 16 will be correspondingly locked. Spring 38$^a$, by its engagement with the upper end of sleeve 27$^a$, holds the sleeve seated on shoulder 44 and causes the sleeve to be lowered with the stem. The periphery of sleeve 27$^a$ adjacent slot 32$^a$ is provided with a scale 45 for indicating the position of the valve-gate 15. A pointer 31$^b$ on lug 31$^c$ which moves vertically with sleeve 27$^a$, indicates on the scale 45, the position of the gate. Normally, member 27$^a$ is locked against rotation relatively to the valve casing by screws 22$^a$; sleeve 27$^a$ is locked against rotation relatively to member 21$^a$ by lug 30$^a$ in slots 32$^a$; handwheel 25$^a$ is locked against rotation by pins 41$^a$ which are confined in notches 40$^a$ in sleeve 27$^a$ so that the valvestem and gate will, through the hand-wheel, be locked in closed position against displacement or vibration or accidental means which may tend to rotate the hand-wheel or stem. When it is desired to open the valve, the operator will push hand-wheel 25 downwardly until screw-pins 41$^a$ pass out of notches 40$^a$ and below flange 43$^a$ on sleeve 27$^a$, at which time the hand-wheel will be unlocked and can be rotated to open the valve. When the handle 25$^a$ is released, spring 38$^a$ will press the hand-wheel upwardly to bring pins 41$^a$ into notches 40$^a$ and lock the hand-wheel and stem in any assigned position. When the handle is released it may be reversely rotated to close the valve. As the stem 16$^a$ is rotated, sleeve 27$^a$ will move vertically with the stem and the index pointer 30$^b$ will indicate on scale 45 the position of the valve-gate 15.

The invention exemplifies a valve which comprises a gate connected to, and a valve-stem for shifting the gate by means of a screw-threaded connection for a casing with simple and efficient means for locking the hand-wheel and stem against rotation for preventing displacement of the gate by vibration or other unintentional causes. The locking-means is simple in construction and can be economically produced.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with a valve comprising a casing, a gate in the casing, a stem for shifting the gate, and a screw-connection between the casing and the stem, of a sleeve-member secured on to the casing, a locking-sleeve through which the stem extends, slidably mounted in, and non-rotatably connected to, said member, means on the stem for slidably shifting the sleeve in said member, a handle slidably mounted on, and connected to rotate, the stem, means between the sleeve and the handle for locking the handle against rotation and releasable by sliding movement of the handle on the stem, and spring-means for holding the handle in its locked position.

2. The combination with a valve comprising a casing, a gate in the casing, a stem for shifting the gate, and a screw-connection between the casing and the stem, of a sleeve-member screw-threaded to the casing, a locking-sleeve through which the stem extends slidably mounted in, and non-rotatably connected to, said member, a screw-thread on the stem for slidably shifting the sleeve in said member, a handle slidably mounted on, and connected to rotate, the stem, means between the sleeve and the handle for locking the handle against rotation and releasable by sliding movement of the handle on the stem, and spring-means for holding the handle in its locked position.

3. The combination with a valve comprising a casing, a gate in the casing, a stem for shifting the gate, and a screw-connection between the casing and the stem, of a sleeve-member secured to the casing, a locking-sleeve through which the stem extends, slidably mounted in, and non-rotatably connected to, said member, means on the stem for slidably shifting the sleeve in said member, a handle slidably mounted on, and connected to rotate, the stem, means between the sleeve and the handle for locking the handle against rotation and releasable by sliding movement of the handle on the stem, and spring-means pressing the handle away from the casing for holding the handle in its locked position.

4. The combination with a valve comprising a casing, a gate in the casing, a stem for shifting the gate, and a screw-connection between the casing and the stem, of a sleeve-member secured to the casing, a locking sleeve through which the stem extends, slidably mounted in, and non-rotatably connected to, said member, means on the stem for slidably shifting the sleeve in said member, a handle slidably mounted on, and connected to rotate the stem, complementary locking elements on the inner end of the handle and the outer end of the sleeve, releasable by sliding movement of the handle on the stem, and spring-means for holding the handle so the locking elements will be normally engaged.

5. The combination with a valve comprising a casing, a gate in the casing, a stem for shifting the gate, and a screw connection between the casing and the stem, of a sleeve-member screw-threaded to the casing, a locking-sleeve through which the stem extends slidably, mounted in, and non-rotatably connected to, said member, a screw-thread on the stem for slidably shifting the sleeve in said member, a handle slidably mounted on, and connected to rotate the stem, complementary locking elements on the inner end of the handle and the outer end of the sleeve, releasable by sliding movement of the handle on the stem, and spring-means for holding the handle so the locking-elements will be normally engaged.

6. The combination with a valve comprising a casing, a gate in the casing, a stem for shifting the gate, and a screw-connection between the casing and the stem, of a sleeve-member screw-threaded to the casing, means for locking the sleeve-member against rotation, a packing-box in the casing, a packing follower held by said sleeve-member, a locking-sleeve through which the stem extends, slidably mounted and non-rotatably held in said sleeve-member, means on the stem for shifting the sleeve longitudinally in said member, a handle slidably connected to, and adapted to rotate, the stem, means between the sleeve and the handle for locking the handle against rotation, releasable by sliding movement of the handle on the stem, and spring-means for holding the handle in its locked position.

7. The combination with a valve comprising a casing, a gate in the casing, a stem for shifting the gate, and a screw-connection between the casing and the stem, of a sleeve-member screw-threaded to the casing, means for locking the sleeve-member against rotation, a packing-box in the casing, a packing follower held by said sleeve-member, a locking-sleeve through which the stem extends, slidably mounted and non-rotatably held in said sleeve-member, a screw-thread on the stem for shifting the sleeve longitudinally in said member, a handle slidably connected to, and adapted to rotate, the stem, means between the sleeve and the handle for locking the handle against rotation, releasable by sliding movement of the handle on the stem, and spring-means for holding the handle in its locked position.

8. The combination with a valve comprising a casing, a gate in the casing, a stem for shifting the gate, and a screw-connection between the casing and the stem, of a sleeve-member screw-threaded to the casing, a locking-sleeve through which the stem extends slidably mounted in, and non-rotatably connected to, said member, means on the stem for slidably shifting the sleeve in said member, a handle slidably mounted on, and connected to rotate, the stem, said sleeve being provided at its upper end with a projecting flange having notches therein, the handle being provided with elements to enter said notches for locking the handle against rotation and releasable by sliding movement of the handle on the stem, and spring-means for holding the handle in its locked position.

9. The combination with a valve comprising a casing, a gate in the casing, a stem for shifting the gate, and a screw-connection between the casing and the stem, of a sleeve-member screw-threaded to the casing, a locking-sleeve through which the stem extends slidably mounted in, and non-rotatably connected to, said member, means on the stem for slidably shifting the sleeve in said member, a handle slidably mounted on, and connected to rotate, the stem, said sleeve being provided at its upper end with a projecting flange having notches therein, the handle being provided with a depending flange around the flange on the sleeve and elements extending inwardly from the flange on the handle to enter said notches for locking the handle against rotation, and releasable by sliding movement of the handle on the stem, and spring-means for holding the handle in its locked position.

10. The combination with a valve comprising a casing, a gate in the casing, a stem for shifting the gate, and a screw-connection between the casing and the stem, of a sleeve-member secured to the casing, a locking sleeve through which the stem extends, slidably mounted in said member and provided with a series of longitudinal grooves, an element on the sleeve-member adapted to extend into said grooves to hold the sleeve against rotation in said member, means on the stem for slidably shifting the sleeve in said member, a handle slidably mounted on, and connected to rotate the stem, means between the sleeve and the handle for locking the handle against rotation, and releasable by sliding movement of the handle on the stem, and spring-means for holding the handle in its locked position.

11. The combination with a valve comprising a casing, a gate in the casing, a stem for shifting the gate, and a screw-connection between the casing and the stem, of a sleeve-member secured to the casing, a locking-sleeve through which the stem extends, slidably mounted in said member and provided with a series of longitudinal grooves, an element on the sleeve-member adapted to extend into said grooves to hold the sleeve against rotation in said member, means on the stem for slidably shifting the sleeve in said member, a handle slidably mounted on, and connected to rotate, the stem, a flange at the upper end of the sleeve provided with notches, the handle being provided with elements to enter said notches for locking the handle against rotation, and releasable by sliding movement of the handle on the stem, and spring-means for holding the handle in its locked position.

12. The combination with a valve comprising a casing, a gate in the casing, a stem for shifting the gate, and a screw-connection between the casing and the stem, of a sleeve-member secured to the casing, a locking-sleeve through which the stem extends, a shoulder on the stem for slidably shifting the sleeve in said member, means between the sleeve-member and the sleeve for holding the sleeve against rotation, a handle slidably mounted on, and connected to rotate, the stem, means between the sleeve and the handle for locking the handle against rotation, releasable by sliding movement of the handle on the stem, and spring-means for holding the handle in its locked position.

13. The combination with a valve comprising a casing, a gate in the casing, a stem for shifting the gate, and a screw-connection between the casing and the stem, of a sleeve-member secured to the casing, a locking-sleeve through which the stem extends, a shoulder on the stem for slidably shifting the sleeve in said member, means between the sleeve-member and the sleeve for holding the sleeve against rotation, a handle slidably mounted on, and connected to rotate, the stem, means between the sleeve and the handle for locking the handle against rotation, releasable by sliding movement of the handle on the stem, and spring-means between the handle and the sleeve for holding the handle in its locked position and holding the sleeve against said shoulder.

14. The combination with a valve comprising a casing, a gate in the casing, a stem for shifting the gate, and a screw-connection between the casing and the stem, of a sleeve-member secured to the casing, a locking-sleeve through which the stem extends, a shoulder on the stem for slidably shifting the sleeve in said member, the sleeve-member being provided with a slot and indicating means, an element on the sleeve extending into and through the slot movable along said indicating means, a handle slidably mounted on, and connected to rotate, the stem, means between the sleeve and the handle for locking the handle against rotation, releasable by sliding movement of the handle on the stem, and spring-means between the handle and the sleeve for holding the handle in its locked position.

15. The combination with a valve comprising a casing, a gate in the casing, a stem for shifting the gate, and a screw-connection between the casing and the stem of a sleeve-member secured to the casing, a locking-sleeve through which the stem extends slidably mounted in, and non-rotatably connected to, said member, means on the stem for slidably shifting the sleeve in said member, a handle slidably mounted on, and connected to rotate, the stem, means between the sleeve and the handle for locking the handle against rotation and releasable by sliding movement of the handle on the stem, and spring-means pressing the handle toward the casing for holding the handle in its locked position.

FRANZ LUENZ.